United States Patent
Lu et al.

(10) Patent No.: US 11,966,522 B2
(45) Date of Patent: Apr. 23, 2024

(54) STYLUS PEN AND PEN CORE THEREOF

(71) Applicant: DEXIN CORP., New Taipei (TW)

(72) Inventors: Ho Lung Lu, New Taipei (TW);
Shih-Hsiung Hsiao, New Taipei (TW);
Chun Te Yu, New Taipei (TW)

(73) Assignee: DEXIN CORP., New Taipei (TW)

( * ) Notice: Subject to any disclaimer, the term of this patent is extended or adjusted under 35 U.S.C. 154(b) by 0 days.

(21) Appl. No.: 18/089,296

(22) Filed: Dec. 27, 2022

(65) Prior Publication Data
US 2023/0393671 A1   Dec. 7, 2023

Related U.S. Application Data

(60) Provisional application No. 63/347,936, filed on Jun. 1, 2022.

(51) Int. Cl.
*G06F 3/0354*   (2013.01)

(52) U.S. Cl.
CPC ............................. *G06F 3/03545* (2013.01)

(58) Field of Classification Search
CPC .................................................. G06F 3/03545
See application file for complete search history.

(56) References Cited

U.S. PATENT DOCUMENTS

| | | | |
|---|---|---|---|
| 10,549,571 B1* | 2/2020 | Abel | B25G 1/04 |
| 2016/0018912 A1* | 1/2016 | Kaneda | G06F 3/033 |
| | | | 345/179 |
| 2017/0083122 A1* | 3/2017 | Kanno | G06F 3/03545 |
| 2017/0102792 A1* | 4/2017 | Aoki | G06F 3/0383 |
| 2018/0267636 A1* | 9/2018 | Chiu | G06F 3/03545 |
| 2019/0155408 A1* | 5/2019 | Hou | G06F 3/03545 |
| 2020/0042113 A1* | 2/2020 | Chen | G06F 3/0383 |
| 2021/0247858 A1* | 8/2021 | Hashimoto | G06F 3/03545 |
| 2021/0405786 A1* | 12/2021 | Kaneda | B43K 29/08 |

\* cited by examiner

*Primary Examiner* — Temesghen Ghebretinsae
*Assistant Examiner* — Ivelisse Martinez Quiles
(74) *Attorney, Agent, or Firm* — Maschoff Brennan

(57) ABSTRACT

A stylus pen includes a penholder comprising a rod body and an electrode structure disposed on the rod body and a pen core comprising a tip portion located at one end of the rod body and an insertion portion connected to the tip portion and removably inserted into the rod body, the tip portion is spaced apart from the electrode structure, the insertion portion is electrically conductive, and the tip portion is made of material being electrically conductive and writable on paper.

9 Claims, 5 Drawing Sheets

STYLUS PEN AND PEN CORE THEREOF

CROSS-REFERENCE TO RELATED APPLICATIONS

This application claims the priority benefits of U.S. provisional application Ser. No. 63/347,936, filed on Jun. 1, 2022. The entirety of each of the above-mentioned patent application is hereby incorporated by reference herein.

TECHNICAL FIELD

The disclosure relates to a pen core and a stylus pen including the same.

BACKGROUND

The stylus (also called "stylus pen") is a pen-shaped instrument can be employed as a writing utensil to input instruction to devices with touch screen, such as such as smartphone, personal digital assistant, game console, graphic tablet.

However, unlike the feeling of using a real pencil to write on paper, some user might feel a bit unsettled by the feeling of drawing on glass touch screen. Thus, users in some situations would rather find a real pencil to write or draw on paper instead of writing on a glass screen since the conventional stylus pen is unable to provide a true "pencil-on-paper" experience.

SUMMARY

Accordingly, one aspect of the disclosure is to provide a stylus pen and a pen core which can be employed as a writing utensil to write or draw on touch screen and paper.

One embodiment of the disclosure provides a stylus pen including a penholder comprising a rod body and an electrode structure disposed on the rod body and a pen core comprising a tip portion located at one end of the rod body and an insertion portion connected to the tip portion and removably inserted into the rod body, the tip portion is spaced apart from the electrode structure, the insertion portion is electrically conductive, and the tip portion is made of material being electrically conductive and writable on paper.

One embodiment of the disclosure provides a pen core comprising a tip portion and an insertion portion connected to the tip portion, the insertion portion is electrically conductive, and the tip portion is made of material being electrically conductive and writable on paper.

According to the stylus pen the pen core as discussed in the above embodiments of the disclosure, the tip portion of the pen core is electrically conductive and able to write on paper, thus the pen core makes the stylus pen not only able to input instruction to touch screen but also to write or draw on paper, allowing user to selectively write on touch screen or paper.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," and variations thereof are used broadly and encompass both direct and indirect mountings and connections. As used herein, the phrase "at least one" as used herein may mean that the quantity of the described element or component is one or more than one but does not necessarily mean that the quantity is only one. The term "and/or" may be used herein to indicate that either or both of two stated possibilities.

Hereinafter, the disclosure provides various exemplary pen cores and stylus pens including the same. With the pen cores of the disclosure, the tip position of the stylus pen on a touch screen of a device, such as smartphone, personal digital assistant, game console, graphic tablet, can be detected; thus, the pen cores of the disclosure make the stylus pen have the same function as a mouse or touchpad as a pointing device and therefore the stylus pen are able to provide more accurate and controllable input. Meanwhile, the pen cores of the disclosure make the stylus pen have the function same as a regular pencil so that the stylus pens of the disclosure are able to write or draw on paper (in other words, the pen cores of the disclosure are writable on paper to provide a true "pencil-to-paper" experience). In short, the pen cores of the disclosure make the stylus pens having the same able to be used as a writing utensil to write or draw on touch screen and paper.

Figure 1:
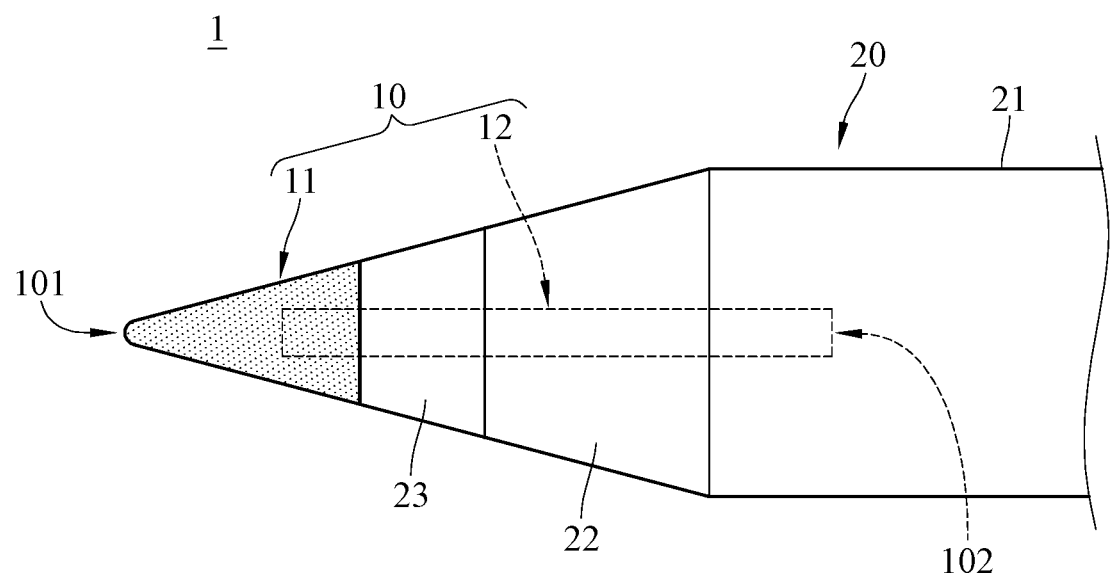
FIG. 1 is a partially enlarged schematic view of a stylus pen according to one embodiment of the disclosure.

Firstly, referring to FIG. 1, one embodiment of the disclosure provides a stylus pen (also called "stylus") 1. As shown, the stylus pen 1 may be a pen-shaped instrument. It is noted that the devices that support the stylus pen 1 may be MPP (Microsoft Pen Protocol) enabled; in other words, the devices that support the stylus pen 1 may support MPP. In some other embodiments, the devices that support the stylus pen of the disclosure may support other suitable protocols according to the configuration of the stylus pen.

In this embodiment, the stylus pen 1 may include a pen core 10 and a penholder 20. The pen core 10 is removably installed on the penholder 20. The pen core 10 is partially inserted into the penholder 20. The part of the pen core 10 that is exposed from the penholder 20 may be tapered and therefore can be used as a tip portion for the stylus pen 1 to emit electrical signal. The penholder 20 may mean the rest part of the stylus pen 1 except for the pen core 10. The penholder 20 may have any suitable shape and size that is handheldable.

The penholder 20 may include a rod body 21 and an electrode structure 22. The rod body 21 means the part of the penholder 20 that can be held in hand. The rod body 21 may have digital components or circuits inside that can communicate with a digitizer on the touch device. The rod boy 21 may have an outer casing made of any suitable electrical insulation material, such as plastic, wood, silicon, or combination thereof. The electrode structure 22 may be sleeved on the rod body 21 and fixed to the rod body 21 via any suitable means. The electrode structure 22 may be made of any suitable electrically conductive material, such as copper, aluminum, or alloy thereof. The electrode structure 22 is provided to emit electrical signal.

Optionally, the penholder 20 may further include an electrically insulating material 23. The electrically insulating material 23 may be plastic, wood, rubber, silicone, or combination thereof. The electrically insulating material 23 may be sleeved on the rod body 21 and fixed to the rod body 21 via any suitable means. The pen core 10 is electrically conductive. The pen core 10 and the electrode structure 22 may be spaced apart from each other by the electrically insulating material 23 and the pen core 10 and the electrode structure 22 are electrically decoupled with each other. As long as the pen core is not directly electrically connected to the electrode structure, the stylus pen in other embodiment may omit the electrically insulating material 23.

The electrode structure 22 may have a ring shape that surrounds the rod body 21. In some other embodiments, the electrode structure may be a group of separated electrodes arranged around the rod body 21. The pen core 10 and the electrode structure 22 are configured to emit multiple wireless signals detectable by an array of sensors on touch screen so that the sensors can determine the position and/or tilt angle of the pen core 10. Note that the details of how the stylus pen 1 communicates with touch screen are not intended to limit the disclosure.

The stylus pen 1 may also be used to write or draw on paper. Specifically, the pen core 10 may include a tip portion 11 and an insertion portion 12 connected to the tip portion 11. Specifically, the tip portion 11 is electrically connected to the insertion portion 12. The insertion portion 12 means the part of the pen core 10 used to be inserted into the rod body 21 of the penholder 20. The insertion portion 12 is configured to enable signal communication and interaction between the tip portion 11 and relevant electrical/nonelectrical elements inside the rod body 21. The insertion portion 12 may be integrally formed of any suitable electrically conductive material, such as copper, aluminum, or alloy thereof. The tip portion 11 means the part of the pen core 10 that is arranged at a distal end of the rod body 21 and exposed to outside. The tip portion 11 is employed as the part of the stylus pen 1 used to directly contact the surface of touch screen and paper. The tip portion 11 and the electrode structure 22 on the rod body 21 are spaced apart from each other and are not electrically coupled with each other.

The tip portion 11 may be made of material that is electrically conductive and able to write on paper. The tip portion 11 may be an integrally formed single piece. The tip portion 11 may be made of graphite, lead, silver, or combination thereof. Thus, the tip portion 11 may be served as a solid pigment core that can create marks by physical abrasion, leaving a trail of solid core material that adheres to paper or other surface. As such, the tip portion 11 not only can input instruction to touch screen but also can write or draw on paper or other surface.

Further, the tip portion 11 and the insertion portion 12 are both made of electrically conductive material, thus from a first distal end 101 of the tip portion 11 which is located away from the insertion portion 12 to a second distal end 102 of the insertion portion 12 which is located away from the tip portion 11, there is no electrically insulating material. In other words, the pen core 10 is absent of electrically insulating material. As such, the pen core 10 still can emit signal as required while the part of the insertion portion 12 that is inserted into the tip portion 11 is short and not too close to the first distal end 101. This ensures that the pointy area of the tip portion 11 (i.e., the first distal end 101) has a sufficient volume for write on paper, obtaining a longer lifespan.

The tip portion 11 and the insertion portion 12 may be fixed to each other via any suitable means, such as adhesive. In some other embodiments, the tip portion 11 and the insertion portion 12 may be fixed to each other by engagement of mating shapes thereof.

The following provides other exemplary pen cores of the disclosure with reference to FIGS. 2-4, but for the purpose of simplicity, only the main differences between the introduced embodiments and the previous embodiments will be described in detail, and the same or similar parts can be comprehended with reference to the corresponding paragraphs and thus will not be repeatedly described hereinafter. It is also noted that the same reference number denote the same component or element.

Figure 2:
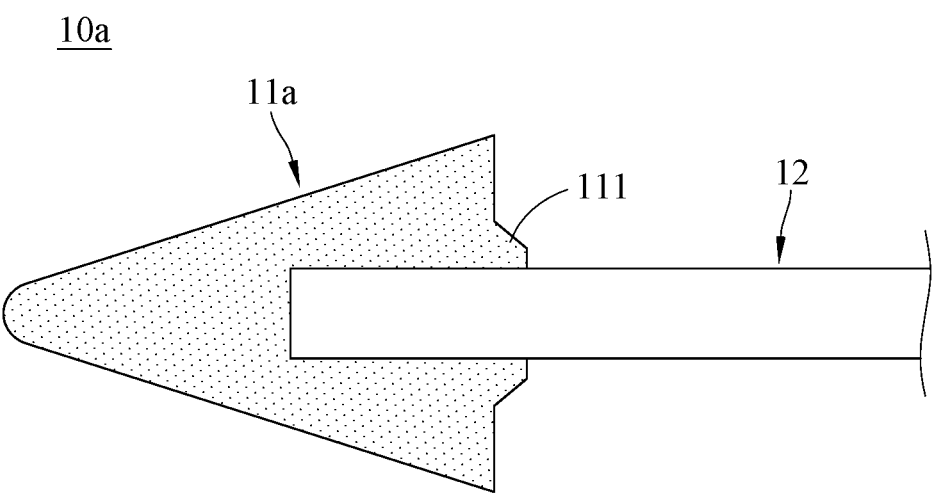
FIG. 2 is a partially enlarged schematic view of a pen core according to one embodiment of the disclosure.

Firstly, please refer to FIG. 2, a pen core 10a according to another embodiment of the disclosure is provided. In this embodiment, the insertion portion 12 is partially inserted into a tip portion 11a, the insertion portion 12 is fixed to the tip portion 11a by tight contact therebetween. Optionally, a suitable adhesive may be provided between the tip portion 11a and the insertion portion 12 to enhance the engagement between the tip portion 11a and the insertion portion 12. Further, a protrusion 111 may be integrally formed at a side of the tip portion 11a which faces towards the insertion portion 12, the protrusion 111 may have a cross-section in trapezoidal shape, and the insertion portion 12 is disposed through the protrusion 111. The protrusion 111 helps increase the contact area between the tip portion 11a and the insertion portion 12 and therefore is favorable for enhancing and stabilizing the engagement between the tip portion 11a and the insertion portion 12.

Figure 3:
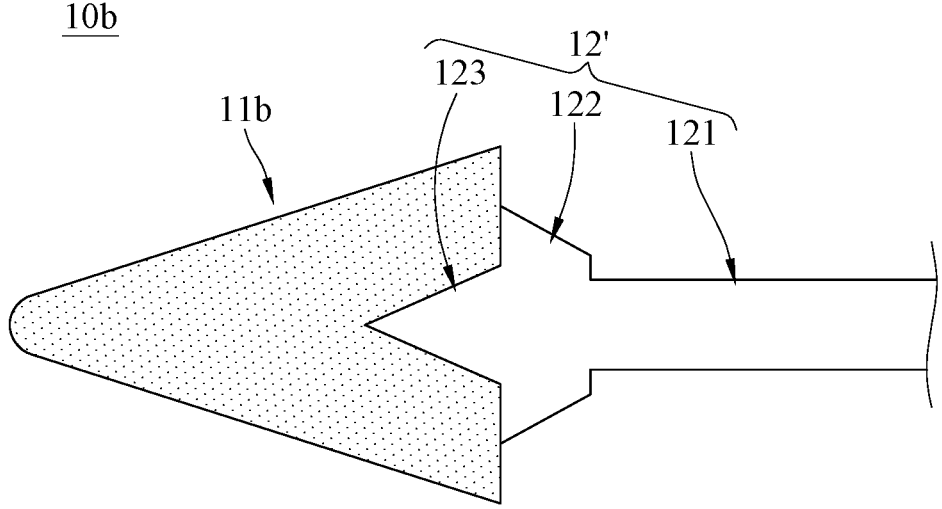
FIG. 3 is a partially enlarged schematic view of a pen core according to one embodiment of the disclosure.

Please refer to FIG. 3, a pen core 10b according to another embodiment of the disclosure is provided. In this embodiment, an insertion portion 12' is partially inserted into a tip portion 11b, the insertion portion 12' is fixed to the tip portion 11b by tight contact therebetween. Optionally, a suitable adhesive may be provided between the tip portion 11b and the insertion portion 12' to enhance the engagement between the tip portion 11b and the insertion portion 12'. Further, the insertion portion 12' may include a rod portion 121, a abutting block portion 122, and an embedded portion 123, the abutting block portion 122 is connected between the rod portion 121 and the embedded portion 123, the abutting block portion 122 may have a cross-section in trapezoidal shape, the embedded portion 123 means the part of the insertion portion 12' used to be embedded in the tip portion 11b, the embedded portion 123 may be tapered away from the abutting block portion 122. As such, the proportion of the tip portion 11b in the pen core 10b is increased while the engagement between the tip portion 11b and the insertion portion 12' is further enhanced and stabilized.

Figure 4:
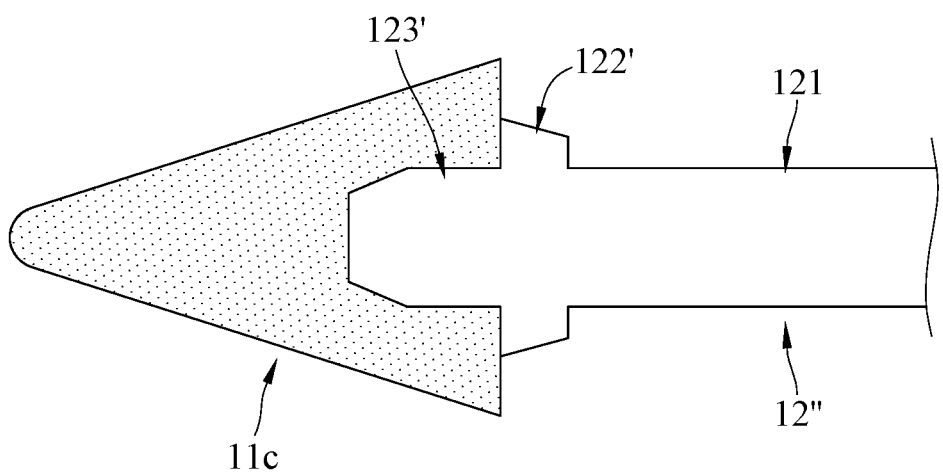
FIG. 4 is a partially enlarged schematic view of a pen core according to one embodiment of the disclosure.

Please refer to FIG. 4, a pen core 10c according to another embodiment of the disclosure is provided. In this embodiment, an insertion portion 12" is partially inserted into a tip portion 11c, the insertion portion 12" is fixed to the tip portion 11c by tight contact therebetween. Optionally, a suitable adhesive may be provided between the tip portion 11c and the insertion portion 12" to enhance the engagement between the tip portion 11c and the insertion portion 12". Further, the insertion portion 12" may include a rod portion 121, an abutting block portion 122', and an embedded portion 123', the abutting block portion 122' is connected between the rod portion 121 and the embedded portion 123', the embedded portion 123' is embedded in the tip portion 11c and may have a cross-section in prism shape. As such, the engagement between the tip portion 11c and the insertion portion 12" is further enhanced and stabilized.

Figure 5:
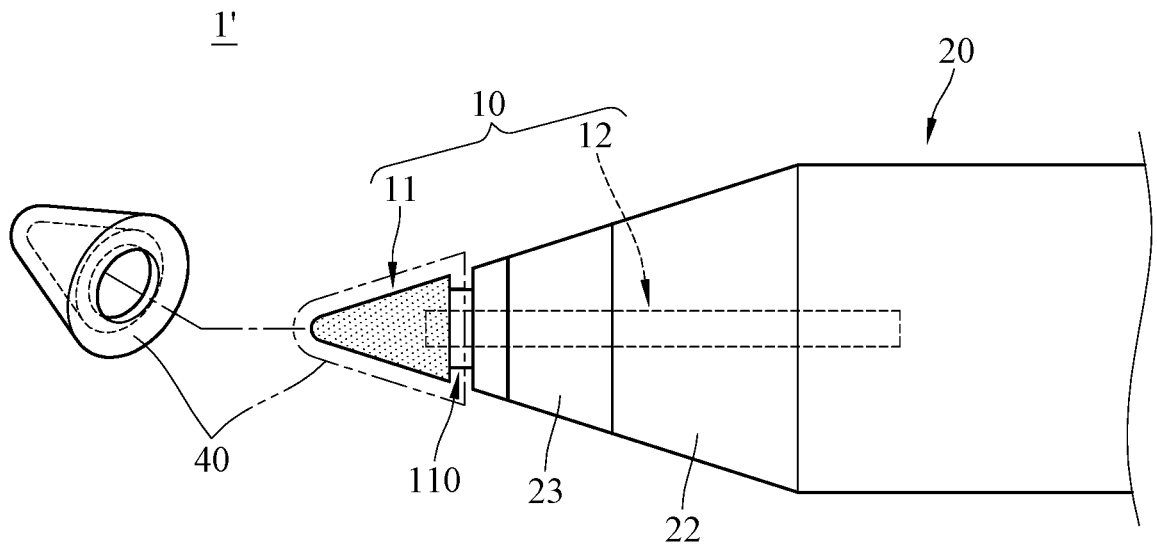
FIG. 5 is a partially enlarged schematic view of a stylus pen according to one embodiment of the disclosure.

Alternatively, please refer to FIG. 5, a stylus pen 1' that includes the pen core 10 according to one embodiment of the disclosure is provided, as shown, there may be a slot 110 formed between the tip portion 11 of the pen core 10 and the penholder 20, the slot 110 may be in ring shape, there may be an insulation cover 40 releasably engaged with the slot 110. The insulation cover 40 may be made of any suitable electrically insulating material, such as plastic, rubber, silicone, or combination thereof. When the insulation cover 40 is engaged with the slot 110, the insulation cover 40 covers the tip portion 11 of the pen core making the stylus pen 1' applicable to capacitive touch screen.

Figure 6:
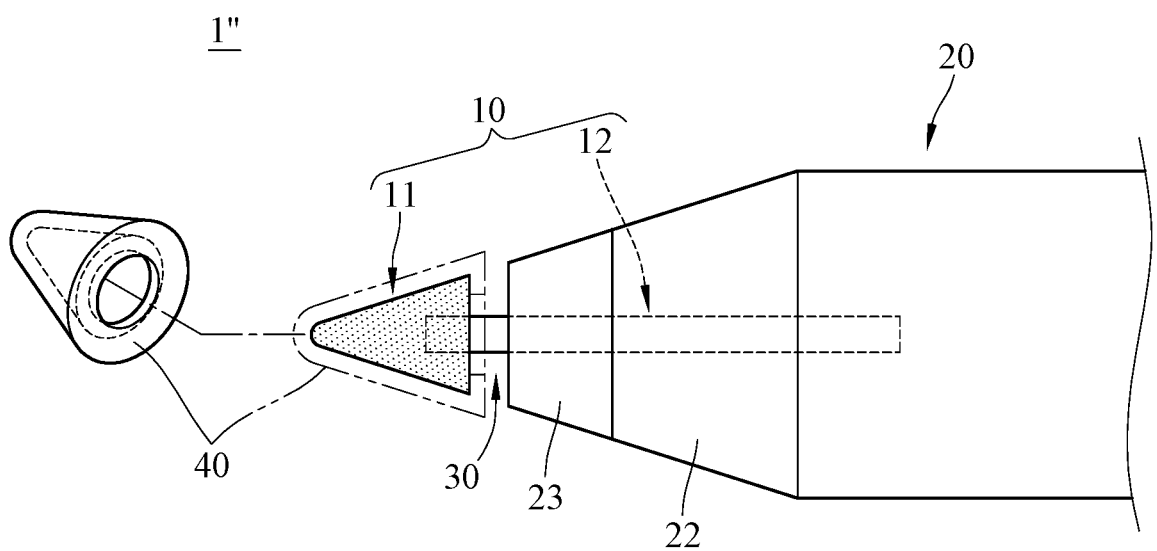
FIG. 6 is a partially enlarged schematic view of a stylus pen according to one embodiment of the disclosure.

Alternatively, please refer to FIG. 6, a stylus pen 1" that includes the pen core 10 according to one embodiment of the disclosure is provided, as shown, the tip portion 11 and the penholder 20 form a slot 30 therebetween, the insulation cover 40 is releasably engaged with the slot 30. When the insulation cover 40 is engaged with the slot 110, the insulation cover 40 covers the tip portion 11 of the pen core 10, making the stylus pen 1" applicable to capacitive touch screen.

Figure 7:
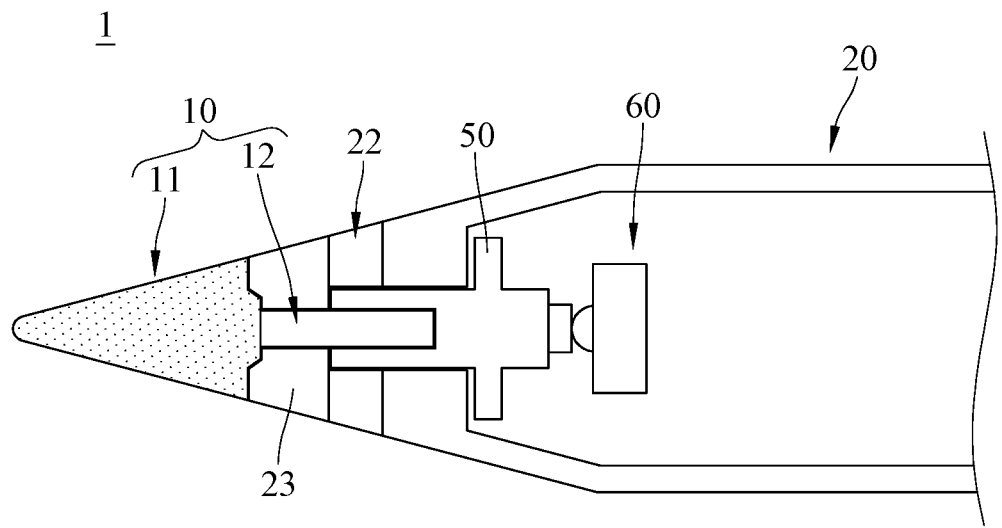
FIG. 7 is a partially enlarged schematic view of a stylus pen according to one embodiment of the disclosure.

The internal of the stylus pen 1 is schematically shown in FIG. 7. As shown, the stylus pen 1 may include a rod fixation seat 50 and a pressure sensor 60 in the penholder 20. The rod fixation seat 50 is configured to receive the insertion portion 12 of the pen core 10 so as to ensure the position of the pen core 10 relative to the penholder 20. The rod fixation seat 50 may be made of any suitable electrically conductive material. The insertion portion 12 of the penholder 20 is able to activate the pressure sensor 60 by forcing the rod fixation seat 50 to push the pressure sensor 60.

Figure 8:
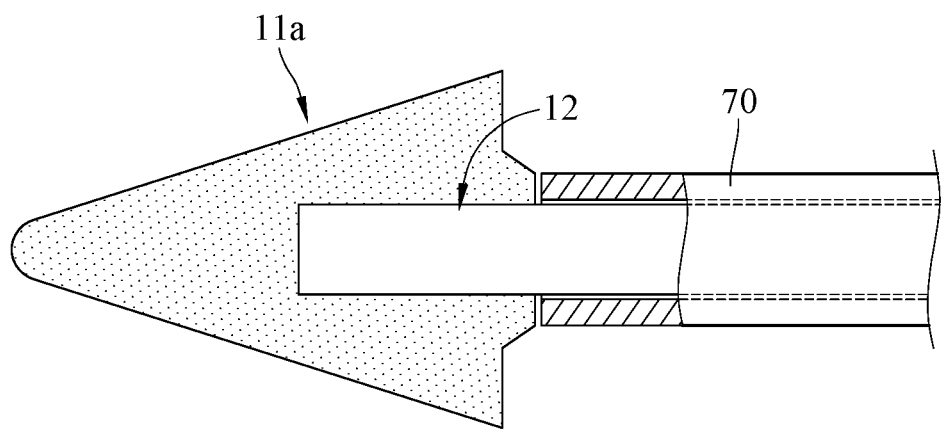
FIG. 8 is a partially enlarged schematic view of a pen core according to one embodiment of the disclosure.

Then, please refer to FIG. 8, a pen core 10a' according to another embodiment is provided, there is a sleeve 70 removably sleeved on the insertion portion 12 so as to protect the insertion portion 12 from damaged or wear by the external structure (e.g., the aforementioned rod fixation seat 50).

Figure 9:
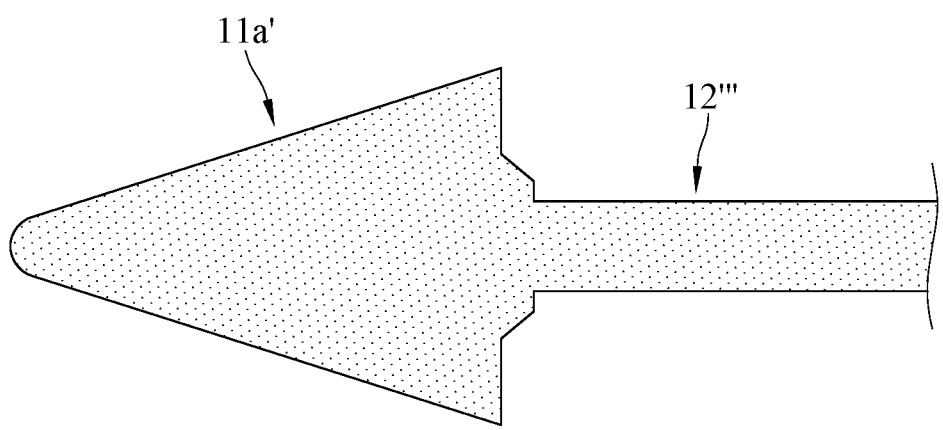
FIG. 9 is a partially enlarged schematic view of a pen core according to one embodiment of the disclosure.

Then, please refer to FIG. 9, a pen core 10d according to another embodiment is provided, the pen core 10d includes a tip portion 11a' and an insertion portion 12''' which are integrally formed with each other. Specifically, the tip portion 11a' and the insertion portion 12''' may be integrally formed of a material that is electrically conductive and able to write on paper, such as graphite, lead, or silver.

According to the stylus pens and the pen cores as discussed in the above embodiments of the disclosure, the tip portion of the pen core is electrically conductive and able to write on paper, thus the pen core makes the stylus pen not only able to input instruction to touch screen but also to write or draw on paper, allowing user to selectively write on touch screen or paper.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A stylus pen, comprising:
a penholder comprising a rod body and an electrode structure disposed on the rod body; and
a pen core comprising a tip portion located at one end of the rod body and an insertion portion connected to the tip portion and removably inserted into the rod body, wherein the tip portion is spaced apart from the electrode structure;
wherein the insertion portion is electrically conductive and the tip portion is made of material being electrically conductive and writable on paper;
wherein the insertion portion comprises a rod portion, an abutting block portion, and an embedded portion, the abutting block portion is connected between the rod portion and the embedded portion, the abutting block portion has a cross-section in trapezoidal shape, the embedded portion is inserted into the tip portion and is tapered away from the abutting block portion, and the abutting block portion is tapered away from the embedded portion;
wherein the embedded portion comprises an extension part and a tapered part, one side of the extension part is connected to the abutting block portion, the tapered part of the embedded portion has a first end, a second end located opposite to the first end, an end surface and an annular inclined surface, the first end of the tapered part is connected to another side of the extension part, an outer diameter of the first end of the tapered part is equal to an outer diameter of the extension part, an outer diameter of the second end of the tapered part is smaller than the outer diameter of the first end of the tapered part, the end surface is located at the second end, the annular inclined surface extends from the first end to the second end of the tapered part, and the annular inclined surface is at an obtuse angle to the end surface.

2. The stylus pen according to claim 1, wherein the tip portion comprises graphite, lead, silver, or an alloy thereof.

3. The stylus pen according to claim 1, wherein the insertion portion comprises copper, aluminum, or an alloy thereof.

4. The stylus pen according to claim 1, further comprising an insulation cover, wherein the tip portion has a slot, the insulation cover is removably engaged with the slot to cover the tip portion.

5. The stylus pen according to claim 1, further comprising an insulation cover, wherein the tip portion and the penholder are spaced apart from each other by a slot, the insulation cover is removably engaged with the slot to cover the tip portion.

6. The stylus pen according to claim 1, wherein an outer diameter of the abutting block portion is smaller than a maximum outer diameter of the tip portion.

7. A pen core, comprising:
a tip portion; and
an insertion portion connected to the tip portion;
wherein the insertion portion is electrically conductive and the tip portion is made of material being electrically conductive and writable on paper;
wherein the insertion portion comprises a rod portion, an abutting block portion, and an embedded portion, the abutting block portion is connected between the rod portion and the embedded portion, the abutting block portion has a cross-section in trapezoidal shape, the embedded portion is inserted into the tip portion and is tapered away from the abutting block portion, and the abutting block portion is tapered away from the embedded portion;
wherein the embedded portion comprises an extension part and a tapered part, one side of the extension part is connected to the abutting block portion, the tapered part of the embedded portion has a first end, a second end located opposite to the first end, an end surface and an annular inclined surface, the first end of the tapered part is connected to another side of the extension part, an outer diameter of the first end of the tapered part is equal to an outer diameter of the extension part, an outer diameter of the second end of the tapered part is smaller than the outer diameter of the first end of the tapered part, the end surface is located at the second end, the annular inclined surface extends from the first end to the second end of the tapered part, and the annular inclined surface is at an obtuse angle to the end surface.

8. The pen core according to claim 7, wherein the tip portion is electrically connected to the insertion portion and comprises graphite, lead, silver, or an alloy thereof.

9. The pen core according to claim 7, wherein an outer diameter of the abutting block portion is smaller than a maximum outer diameter of the tip portion.

* * * * *